(12) United States Patent
Albrecht et al.

(10) Patent No.: US 11,440,542 B2
(45) Date of Patent: Sep. 13, 2022

(54) METHOD FOR SETTING A DRIVING SPEED OF A MOTOR VEHICLE, AND MOTOR VEHICLE WITH A CONTROL DEVICE

(71) Applicant: Volkswagen Aktiengesellschaft, Wolfsburg (DE)

(72) Inventors: Jan-Christoph Albrecht, Wolfsburg (DE); Alexander Wess, Wolfsburg (DE); Hendrik Schröder, Sickte (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 306 days.

(21) Appl. No.: 16/636,274

(22) PCT Filed: Aug. 2, 2018

(86) PCT No.: PCT/EP2018/070927
§ 371 (c)(1),
(2) Date: Feb. 3, 2020

(87) PCT Pub. No.: WO2019/030085
PCT Pub. Date: Feb. 14, 2019

(65) Prior Publication Data
US 2020/0369272 A1    Nov. 26, 2020

(30) Foreign Application Priority Data
Aug. 10, 2017   (DE) .................... 10 2017 213 977.3
Jan. 23, 2018   (DE) .................... 10 2018 200 985.6

(51) Int. Cl.
*B60W 30/14*       (2006.01)
*B60W 30/182*      (2020.01)
(Continued)

(52) U.S. Cl.
CPC ........ *B60W 30/143* (2013.01); *B60W 30/182* (2013.01); *B60W 40/04* (2013.01);
(Continued)

(58) Field of Classification Search
None
See application file for complete search history.

(56) References Cited

U.S. PATENT DOCUMENTS 7,319,927 B1 *   1/2008   Sun .................. B60W 10/06
                                                        701/48
10,137,872 B2 *  11/2018  Goto ................. B60T 8/1769
(Continued)

FOREIGN PATENT DOCUMENTS

DE        10205039 A1    8/2003   ............ B60K 26/00
DE     102010028486 A1  11/2011   ............ B60K 31/00
(Continued)

OTHER PUBLICATIONS

International Search Report and Written Opinion, Application No. PCT/EP2018/070927, 7 pages, dated Oct. 26, 2018.

*Primary Examiner* — Jonathan M Dager
(74) *Attorney, Agent, or Firm* — Slayden Grubert Beard PLLC

(57) ABSTRACT

The invention relates to a method for setting a driving speed of a motor vehicle on a route. A control device of the motor vehicle sets the driving speed depending on an operating position limited by two extreme positions of a pedal device of the motor vehicle, which may be operated by a driver, wherein the control device detects the operating position of the pedal device, and depending on the detected operating position, determines in at least one specified driving mode a target driving speed corresponding to the respective operating position, and the control device sets the driving speed corresponding to the respective target driving speed by means of a closed loop control as long as the respective (Continued)

operating position is detected. The setting in this case takes place independently of a current condition of the route. The invention also includes a motor vehicle.

21 Claims, 2 Drawing Sheets

(51) Int. Cl.
*B60W 40/04* (2006.01)
*B60W 50/08* (2020.01)

(52) U.S. Cl.
CPC ... *B60W 50/087* (2013.01); *B60W 2510/1005* (2013.01); *B60W 2540/10* (2013.01); *B60W 2540/12* (2013.01); *B60W 2555/20* (2020.02)

(56) References Cited

U.S. PATENT DOCUMENTS

| | | | | |
|---|---|---|---|---|
| 2005/0240333 | A1* | 10/2005 | Bauerle | F02D 41/021 123/352 |
| 2011/0066342 | A1* | 3/2011 | Ozaki | B60T 7/042 701/70 |
| 2012/0302401 | A1* | 11/2012 | Fuller | F16H 61/6648 477/115 |
| 2015/0217766 | A1* | 8/2015 | Kelly | B60W 10/184 701/94 |
| 2017/0074201 | A1* | 3/2017 | Sujan | F02M 26/06 |
| 2017/0144661 | A1* | 5/2017 | Miller | B60W 10/06 |
| 2017/0259828 | A1* | 9/2017 | Yamaoka | B60W 10/06 |
| 2018/0208212 | A1* | 7/2018 | Suessenguth | B60W 30/12 |
| 2018/0244247 | A1* | 8/2018 | Carlsson | B60T 7/12 |
| 2019/0291733 | A1* | 9/2019 | Limbacher | B60W 30/143 |
| 2021/0009128 | A1* | 1/2021 | Jokela | B60W 30/18163 |
| 2021/0070301 | A1* | 3/2021 | Vladimerou | B60W 50/00 |

FOREIGN PATENT DOCUMENTS

| | | | | |
|---|---|---|---|---|
| DE | 102014015656 | A1 | 4/2016 | B60W 10/04 |
| DE | 102016121881 | A1 | 5/2017 | B60W 10/04 |
| DE | 102018200985 | A1 | 2/2019 | B60K 23/00 |
| EP | 2626269 | A2 | 8/2013 | B60W 30/14 |
| GB | 2546767 | A | 8/2017 | B60K 31/00 |
| JP | 11227492 | A | 8/1999 | B60K 31/00 |
| WO | 2014/139704 | A1 | 9/2014 | B60K 31/00 |
| WO | 2015/018651 | A1 | 2/2015 | B60K 28/16 |
| WO | 2019/030085 | A1 | 2/2019 | B60W 30/14 |

* cited by examiner

US 11,440,542 B2

METHOD FOR SETTING A DRIVING SPEED OF A MOTOR VEHICLE, AND MOTOR VEHICLE WITH A CONTROL DEVICE

CROSS-REFERENCE TO RELATED APPLICATIONS

This application claims priority to German Patent Application No. DE 10 2017 213 977.3, filed on Aug. 10, 2017 with the German Patent and Trademark Office; and to German Patent Application No. DE 10 2018 200 985.6, filed on Jan. 23, 2018 with the German Patent and Trademark Office. The contents of the aforesaid patent applications are incorporated herein for all purposes.

TECHNICAL FIELD

The invention relates to a method for setting a driving speed of a motor vehicle. The invention also relates to a motor vehicle with a control device for performing the method according to the invention.

BACKGROUND

Motor vehicles are known whose speed may be adapted by a vehicle pedal or a pedal device such as a gas pedal and a brake pedal. The associated disadvantage is that this does not regulate the actually achieved driving speed of the motor vehicle; rather, a driver must change the setting or operating position of the vehicle pedal until a predetermined driving speed is reached.

Driving speed control systems or cruise controls (Tempomaten®) are known with which the driver may enter a certain driving speed, and the vehicle assumes this driving speed. The disadvantage of this is that this constant driving speed must be frequently adapted to a driving situation especially in cross-country driving, wherein adapting by means of a manual entry for example in a lever or pushbutton with two respective directions for increasing or reducing the speed may be inconvenient and too time-consuming so that, in certain circumstances, an adequate driving speed cannot be set in a timely manner. A method for adapting the driving speed of a driving speed control system or a Cruise Control® by the vehicle pedals is also known.

A system and a method are known from WO 2014/139704 A1 for controlling a speed of a motor vehicle. In doing so, a user may set a speed that the vehicle uses for speed control, i.e., as a set or given regulated speed. It is described how the set speed may be reduced by easily actuating the brake pedal. After the brake pedal has been lightly depressed, a modified speed is used for speed control. The associated disadvantage is that the change in speed by the brake pedal may only be in one direction, i.e., as a reduction of the set speed, and another pedal (gas pedal) must be used to increase the set speed. Likewise, the use of a Cruise Control® may for example be unsuitable in cross-country driving since the speed must be continuously adapted in that context, which may be too time-consuming by setting with two vehicle pedals. If the vehicle is wobbling strongly especially in cross-country driving, it may be difficult to only lightly actuate the respective vehicle pedal in a suitable manner, particularly if one has to switch between two pedals.

SUMMARY

An object exists to provide a method by which a driving speed of a motor vehicle is continuously controlled using a vehicle pedal, wherein the driving speed for said speed regulating system is quickly set or adapted with a single vehicle pedal.

This object is solved by an exemplary method for setting a driving speed of a motor vehicle on a route according to the independent claims. Various embodiments of the invention are the discussed in the dependent claims and the following description.

BRIEF DESCRIPTION OF THE DRAWINGS

Figure 1:
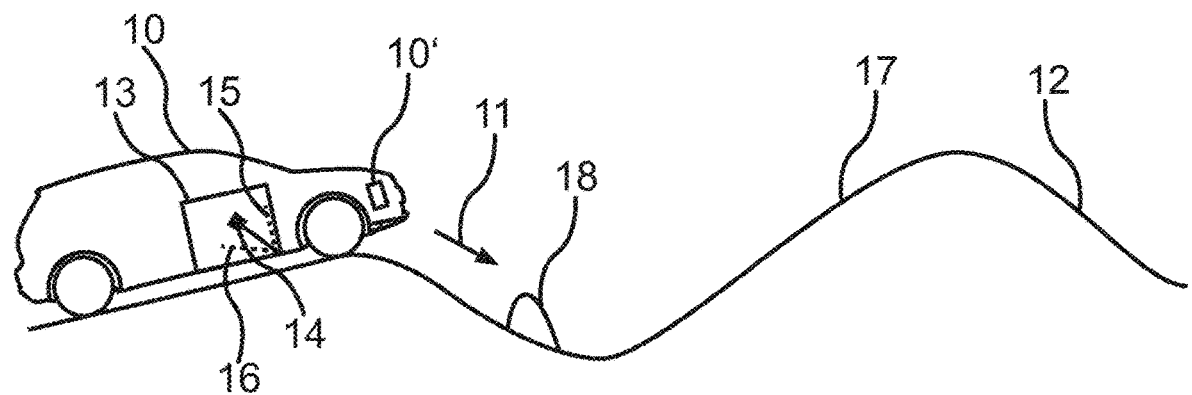
Figure 2:
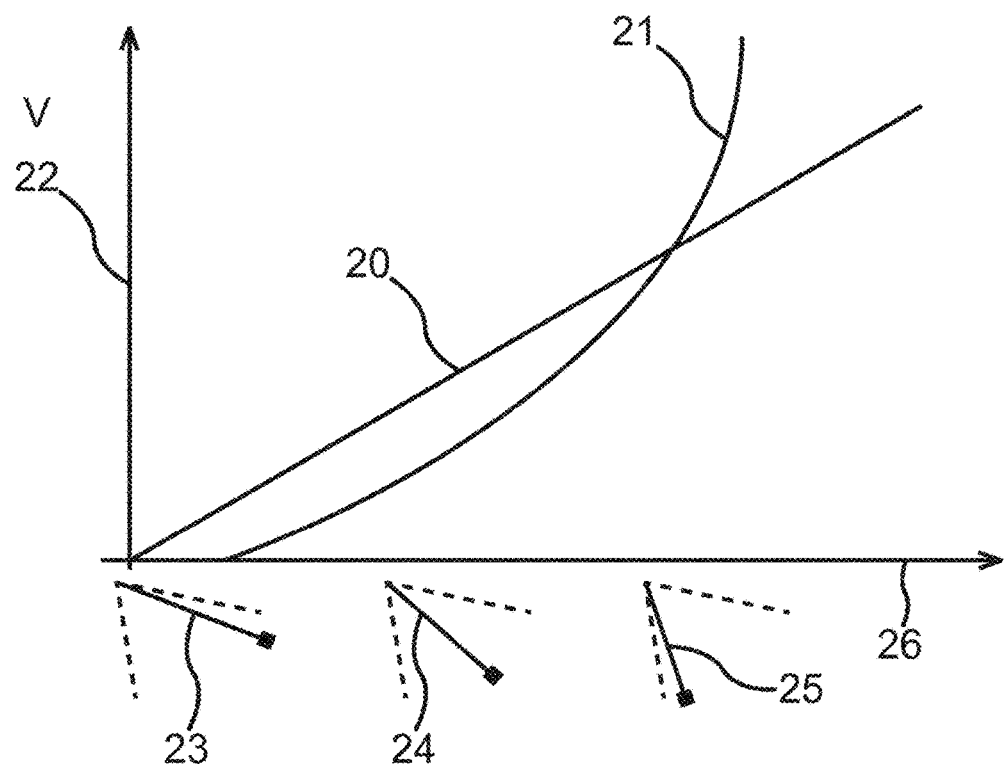
Figure 3:
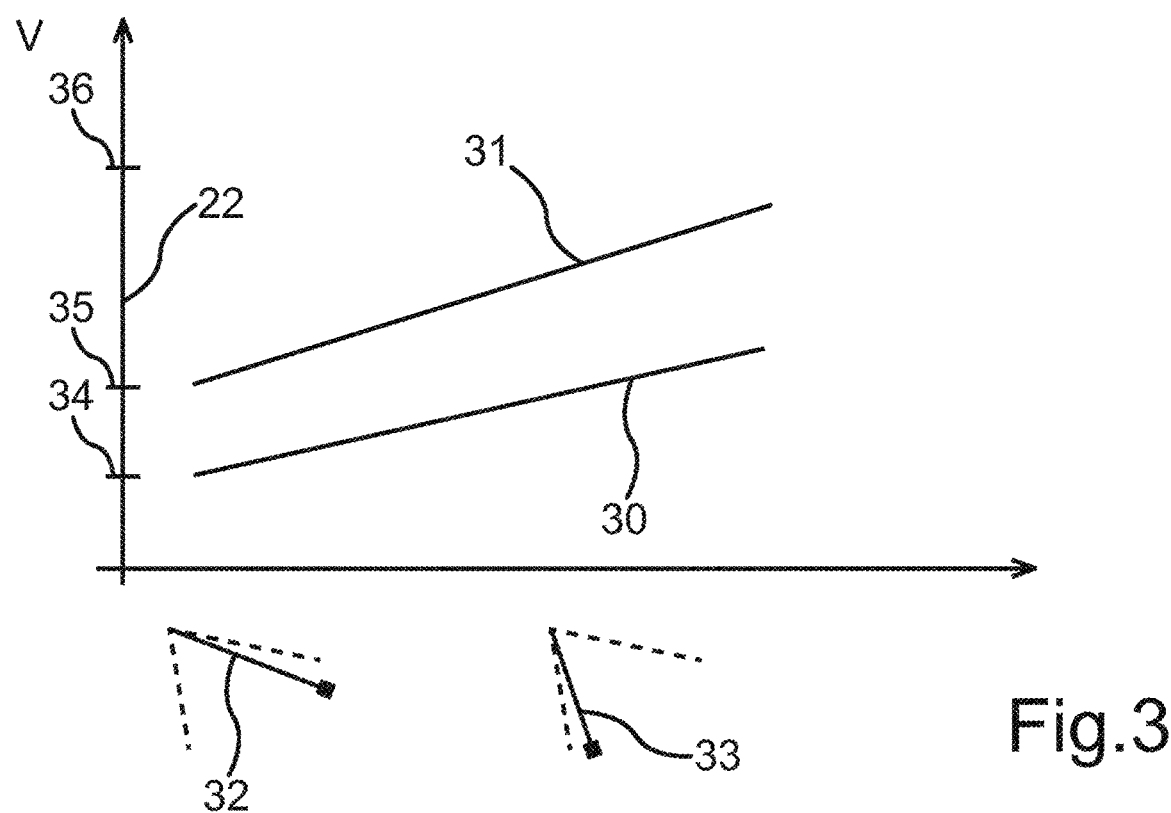

IN THE FIGS.:

FIG. 1 shows a schematic representation of a motor vehicle whose driving speed on a route is set according to an embodiment;

FIG. 2 shows a schematic representation of a linear and a nonlinear pedal characteristic curve; and FIG. 3 shows a schematic representation of a pedal characteristic curve of a first driving mode and a second driving mode.

DETAILED DESCRIPTION

In a first aspect, an exemplary method for setting a driving speed of a motor vehicle on a route is provided. The motor vehicle of this exemplary aspect is located on the route on a trip. In doing so, a control device of the motor vehicle, such as an onboard computer or control unit of the motor vehicle, sets the driving speed depending on an operating position limited by two extreme positions of a pedal device of the motor vehicle that may be operated by a driver. This means that the pedal device has two extreme positions or stop positions between which the respective operating position of the pedal device may be located or changed. For example, the pedal device is a gas pedal and the first extreme position is the unoperated gas pedal, i.e., the gas pedal in a home position or with an operating position of 0%, and the second extreme position is the fully depressed gas pedal, i.e., the gas pedal in a "full-throttle" operating position, or an operating position with the value of 100%. Depending on the operating position in which the pedal device is located, the control device sets a driving speed for the motor vehicle.

According to the present aspect, the control device detects the current operating position of the pedal device in the process. The operating position can be described as a target value of a control variable. The control device therefore detects if a first extreme position exists, for example a 0% depressed pedal device, or if a second extreme position such as a 100% depressed pedal device exists, or if another operating position exists which lies between the two extreme positions. Such an operating position lying between the two extreme positions may for example be a 50% depressed pedal device; this operating position therefore exists when for example a driver presses or operates the pedal device half-way.

Depending on the detected operating position, the control device of the present aspect ascertains, at least in a predetermined driving mode, a target driving speed corresponding to the respective operating position, i.e., to the operating position that is being detected. The operating position is detected continuously in the process, and the target driving speed is continuously ascertained. Such a predetermined driving mode may for example exist if, in a setting in the motor vehicle, a driver sets that the speed should be controlled by the method according to the present aspect. The "corresponding target driving speed" means that depending on the extent at which the pedal device is operated or deflected, a target driving speed is set higher or lower. For example when the pedal device is depressed or operated 10%, a target driving speed may be 20 km/h, and when the pedal device is depressed or operated 90%, the target driving speed may be 180 km/h. In this case, the target driving speed is the driving speed to which the actual driving speed of the motor vehicle should be adapted. If the motor vehicle has for example a driving speed of 10 km/h and the target driving speed is 20 km/h, the control device correspondingly regulates the engine performance so that the driving speed of 10 km/h is increased to 20 km/h. The correspondence between the extent of operating the pedal device, i.e., the operating position, and the associated target driving speed may, e.g., be set as desired by means of a characteristic curve, or a default setting may be used. This setting may for example be made by the manufacturer or also individually set by a vehicle driver. A selection may also be made between different settings so that a different target driving speed is assigned to a first setting at an equivalent operating position than at a second setting.

In the present aspect, the control device sets the actual driving speed of the motor vehicle corresponding to the respective target driving speed by means of a closed loop control. The control device therefore controls the engine performance to the engine performance that is needed for the motor vehicle to actually manifest the ascertained target driving speed. Instead of adapting the engine performance, a brake of the motor vehicle may also be used to reduce the driving speed. The operating position of the pedal device is accordingly used as a target variable for a closed loop control, wherein the driving speed of the motor vehicle is controlled to this target variable as a controlled variable. In doing so, the actual driving speed is adapted to the target driving speed independent of how a current configuration of the route looks like. A "configuration of the route" means for example an incline and/or a descent of the route, or a road or a lane on which the motor vehicle is driving. A "configuration of the route" may also be a bump and/or a pothole, and/or road unevenness. In such situations, a driver must normally change the operating position of the pedal in order to maintain a driving speed. According to the method of this aspect, this is taken over by the control device, and the operating position may remain the same. The respective driving speed in this case is adapted to the target driving speed as long as the respective operating position is detected. If the operating position changes, the driving speed also always follows the change. The target driving speed is therefore always dependent on the respective operating position. In other words, the driving speed is adapted to the respective target driving speed, or is controlled or set thereto, as long as a respective operating position exists, for example as long as a driver of the motor vehicle operates the pedal device. Especially when a driver no longer operates the pedal device, for example it has an operating position of 0%, and a target driving speed of 0 km/h corresponds to an operating position of 0%, the motor vehicle or its control device consequently sets the driving speed to 0 km/h so that the motor vehicle comes to a stop. In other words, the driving speed of the motor vehicle is continuously or always adapted to the target driving speed given by the operating position of the pedal device. If a user or driver presses more strongly on the pedal device, the target driving speed may be increased, and if he reduces the pressure to change the operating position toward 0%, the driving speed may be reduced.

In doing so, the acceleration behavior of the motor vehicle may also be adapted, wherein the acceleration behavior includes both positive and negative accelerations. For example, uncontrolled strong braking or emergency braking is prevented in that a regulator executes an adaptation of the set speed more slowly when the driving pedal springs back or falls back into an unactuated operating position by being released from an actuated operating position. This only applies if a collision of the motor vehicle will not arise from the softer braking which is thereby achieved. Such acceleration behavior may be set by default settings in driving mode, for example depending on the speed range, so that strong or less strong accelerations are possible depending on the setting. It may also be set depending on a current speed range so that for example stronger accelerations are possible at higher speeds than at lower speeds or vice versa, so that the speed control may be individually adapted to a driving style of a driver. The acceleration behavior may also be set by different modes, such as a sports mode and/or an eco-mode to enable on the one hand sporty driving behavior and/or on the other hand energy-saving driving behavior. It may also be set based on actuation behavior so that when the pedal position is quickly changed, fast acceleration (acceleration or braking) occurs, and when the pedal position is slowly changed, slow acceleration occurs.

The benefit resulting of the method of this aspect is that a driver of a motor vehicle may specify a target driving speed by operating the pedal device, and may change it easily and quickly at any time by a change of the operating position of the pedal device. In particular if a current configuration of the route changes, the driver does not however have to change the operating position of the pedal device if a speed of the motor vehicle is to be maintained. This is in particular beneficial in cross-country driving with frequently changing inclines and descents of the route since a driver does not always have to change the operating position of the pedal device to maintain a driving speed of the motor vehicle in order to adapt an engine torque or performance to the respective configuration of the route and accordingly maintain the driving speed. Instead according to the method, the engine performance is adapted to the respective configuration of the route, or is automatically adapted, or is adapted without a user intervention by the control device. This yields the benefit that a precise speed may be specified by the operating position of the pedal device which is implemented in the actual driving speed of the motor vehicle independent of an incline or a descent, or unevenness of a route. Another benefit of this method is that the target driving speed to which the driving speed of the motor vehicle is controlled by the control device may be selected with just one pedal device, and the target driving speed may thereby be changed very quickly and easily and intuitively. It may also be possible to control motor vehicles in this manner with just one single pedal.

Embodiments of the method according to the present aspect yield further benefits.

In an embodiment of the method, the target driving speed is increased when the operating position changes toward a first extreme position, and the target driving speed is reduced when the operating position changes toward a second extreme position. This means that for example when the pedal device is depressed more strongly, the operating position of the first extreme position is approached and the target driving speed is accordingly increased. The method may however also be executed so that when the pedal device is depressed more strongly, the operating position approaches the second extreme position and the target driving speed is correspondingly reduced. This embodiment is in particular beneficial because normally in a motor vehicle, the motor vehicle is accelerated when a gas pedal is depressed as the pedal device, and the motor vehicle reduces its speed when a brake pedal is depressed as the pedal device. Accordingly a highly familiar operation of the motor vehicle may be carried out in a simplified manner by the method of this embodiment.

In an embodiment of the method, a single vehicle pedal of the motor vehicle is used as the pedal device, wherein each of the extreme positions corresponds to a target driving speed predetermined by the driving mode. This means that for example just the gas pedal of the motor vehicle is used as the pedal device according to the method, and the target driving speeds that are set by the respective extreme positions of the gas pedal are dependent on a respective driving mode. A driving mode may for example be a first mode, "cross-country driving 1", or a second mode, "cross-country driving 2". In the "cross-country driving 1" mode, the target driving speeds may for example be set so that, in an operating position in the first extreme position of the gas pedal, i.e., an unoperated state or a state operated at 0%, the corresponding target driving speed is 10 km/h, and in an operating position in the second extreme position, i.e., a completely depressed state of the gas pedal or a gas pedal operated at 100%, a corresponding target driving speed is 30 km/h. The corresponding target driving speed of the first extreme position may however also be 0 km/h so that the vehicle may also be brought to a stop by the gas pedal. Contrastingly in the second "cross-country driving 2" mode, the corresponding target driving positions may be 20 km/h in the first extreme position and 60 km/h in the second extreme position. The benefit of this is that the first mode may for example be set to a target driving speed on a route with a poor quality on which the motor vehicle must drive relatively slowly. The driver may set the respective target driving position more precisely by the first "cross-country driving 1" mode within the permitted driving speed range between 10 km/h and 30 km/h so that he possesses the full operating range of the pedal device for operating positions for this value range. In other words, this first mode permits a finer resolution of the operating position of the pedal device. Contrastingly the benefit of the second mode is that it may be set to a target driving speed on a route with a better quality on which the vehicle may at least sometimes travel faster. Since the range defined by the two extreme positions in which the respective target driving speed may be set is greater, a driver may switch more quickly between greater target driving speeds and lesser target driving speeds in this second mode. For example when a road quality suddenly worsens, the target driving speed may for example be quickly decreased when a driver for example reduces the operating position from 90% to 10%. It is also possible for a target driving speed of 0 km/h to correspond to, or to be specified at, an operating position of 0%, and for the value of the target driving speed to also increase when the value of the operating position increases. The benefit of this is that the motor vehicle is at a stop when for example the driving pedal or gas pedal is not operated, and starts when the respective pedal is operated.

An embodiment of the method provides that an acceleration pedal, or gas pedal, or driving pedal is used as the pedal device.

According to the embodiment, a change in the respective operating position from an unoperated extreme position, i.e., 0% operation, to a fully depressed extreme end position, i.e., 100% operation, corresponds to an increase in the target driving speed. This offers the benefit that the driving speed is increased in the usual manner when the gas pedal or accelerator pedal is depressed more strongly, and the driving speed is reduced when the gas pedal is depressed less strongly or to a lesser extent. An alternative form of the embodiment of the method provides that a brake pedal is used as the pedal device. A change in its operating position from an unoperated extreme position, i.e., a gas pedal with the 0% operating position, into a fully depressed extreme position, i.e., a gas pedal with a 100% operating position, corresponds in this case with a reduction in the target driving speed. The benefit here as well is that, through the development of the method, the vehicle reduces its speed in the usual manner in that the brake pedal is depressed more strongly. In particular, a very low vehicle speed, such as a vehicle speed below 6 km/h, may be set very precisely through this development. When a motor vehicle with an internal combustion engine and an engaged transmission is turned on, the motor vehicle normally reaches a so-called creep speed that for example is 6 km/h in the case in which neither the gas pedal nor the brake pedal are actuated. Given a brake pedal with an operating position of 0%, the target driving speed may therefore be the same as the creep speed. Given an operating position of the brake pedal of 100%, the target driving speed may be 0 km/h. It may also be provided according to the method that when the brake pedal is only depressed 80%, i.e., the operating position of the brake pedal is 80%, the target driving speed is set at 0 km/h. The benefit that this offers is that a driver may very precisely set the actual driving speed of the motor vehicle by the actuation of the brake pedal. For example, when the brake pedal is actuated with an operating position of 50%, a target driving speed of 3 km/h is set by the control device which may only be set by a driver manually or independently with great difficulty and imprecisely. Cruise Controls® are also generally not configured to set a driving speed in such low speed ranges. A combined speed setting with the driving pedal and gas pedal is also possible so that for example driving speeds between 0 km/h and 10 km/h may be beneficially set in this case with the brake pedal, and driving speeds between 10 km and approximately 30 km/h may be set with the driving pedal or gas pedal.

An embodiment of the method provides that the target driving speed is ascertained by the operating position of the pedal device in combination with a predetermined pedal characteristic curve of the pedal device. This means that a change in the operating position between the two extreme positions does not have to correspond for example with a change between two extreme target driving speeds. For example, a non-operated gas pedal does not automatically mean a target driving speed of 0 km/h, and a fully depressed gas pedal does not automatically mean a maximum speed of the motor vehicle. Instead, the predetermined pedal characteristic curve may be adapted to a respective driving situation. For example, if the motor vehicle is driving slowly, for example in city driving, a pedal characteristic curve may be set relative to the maximum target driving speed so that a target driving speed of 50 km/h is achieved with a 100% operating position of the gas pedal. Contrastingly in highway driving, a pedal characteristic curve may be set relative to the maximum target driving speed so that a target driving speed of 180 km/h is achieved with a 100% operating position of the gas pedal. Likewise, the target driving speeds may be set for a 0% operating position of the gas pedal (in this case for example 80 km/h in highway driving as the minimum target driving speed of the driving mode), or target driving speeds may be set for the respective operating positions of a brake pedal. The benefit that results from this is that the operating position always provides appropriate operation or resolution for a respective speed range. For example in highway driving, it is normally unnecessary to set target driving speeds below 80 km/h with the pedal device. If necessary, the driving mode may be changed, and an appropriate pedal characteristic curve may be selected.

An embodiment of the method provides that a nonlinear pedal characteristic curve is used as the pedal characteristic curve. This means that for example a target driving speed may be set between 10 km/h and 20 km/h within an operating position range between 10% to 20%, and a target driving speed between 120 and 180 km/h may be set in an operating position range between 80% and 90%. The benefit of this is that a precise setting of the actual driving speed is frequently necessary especially at low driving speeds, whereas a rougher setting option is sufficient for high driving speeds. In other words, a change in the target driving speed relative to a change in the operating position behaves differently with a nonlinear pedal characteristic curve depending on the value range in which the operating position of the pedal device is found. It is also possible for the pedal characteristic curve to be selected by a user and/or to be defined by the user himself. For example, a user may individually set to the effect of the operating position to the respective target driving speed. This is in particular beneficial when a user frequently travels on unfamiliar routes or on certain terrain that requires a certain individual setting of the motor vehicle speed.

An embodiment of the method provides that the pedal characteristic curve is set at least relative to an effect of a change in the operating position on a change in the target driving speed depending on the driving speed and/or a current gear ratio. This means that the target driving speeds corresponding to the extreme positions of the operating position are changed when the motor vehicle achieves a driving speed above a predetermined threshold speed. A number of predetermined threshold speeds may also be defined at which a pedal characteristic curve is changed, or another pedal characteristic curve is set. A pedal characteristic curve may also be changed, or a new pedal characteristic curve may be chosen, when a gear ratio is changed. For example, when a driver is driving in first gear, a first pedal characteristic curve may be set that is configured for low speeds, and when the driver switches to a second gear, a second pedal characteristic curve may be set that is configured for correspondingly higher speeds. Accordingly when driving in first gear, an operating position of 10% may mean a target driving speed of 5 km/h, and in second gear, an operating position of 10% may mean a target driving speed of for example 20 km/h. The benefit of this is that the range of the target driving speed is always adapted to a current driving speed of the motor vehicle.

An embodiment of the method provides that the control device changes the predetermined pedal characteristic curve when a kickdown of the pedal device is detected, or another predetermined pedal characteristic curve is used to determine the target driving speed after a kickdown. A kickdown is known from the prior art, and is when a respective pedal device presses through a resistance that occurs on a pedal path at an end of the pedal path assigned to the fully depressed state of the pedal. A kickdown of the gas pedal may for example be used in a motor vehicle with an automatic transmission to change a gear ratio. The benefit of this development is that when a gear is upshifted, the pedal characteristic curve may simultaneously be adapted to the new gear ratio. A kickdown signal may therefore be reused, which makes the method very efficient.

An embodiment of the present aspect provides that the control device selects the predetermined pedal characteristic curve at least depending on a weather situation that is ascertained by the control device depending on weather data characterizing the weather situation. This means that the predetermined pedal characteristic curve is selected by the control device at least depending on the weather situation. In doing so, the control device receives the weather data that characterize the weather situation. This weather data make it possible to select a respective corresponding predetermined pedal characteristic curve for example in the event of thick fog, strong rain or slick ice. Consequently, an upper speed limit may for example be adapted to the weather situation in which the motor vehicle finds itself by pre-determining the respective pedal characteristic curve. This makes it possible to operate the motor vehicle very safely since the respective predetermined pedal characteristic curve that defines the upper speed limit and the lower speed limit of the motor vehicle may be adapted to the weather situation that for example may characterize inclement weather conditions for a trip of the motor vehicle.

In this context, it has proven to be beneficial when the control device receives the weather data at least from an external higher-level computing apparatus through a radio link. In this case, the control device may receive the weather data for example from an online weather service. In other words, the control device receives the weather data through the Internet, for example via WiFi or via a mobile communications link, whereby the control device may be informed at all times about the current weather situation in which the motor vehicle finds itself, or will find itself in the near future. The control device may be provided with the weather data very safely and reliably via the external higher-level computing apparatus which for example may be a server apparatus. The control device is therefore capable of selecting the predetermined pedal characteristic curve using the current weather situation by means of the weather data received from the external higher-level computing apparatus.

An embodiment provides that the control device receives the weather data at least from a vehicle component of the motor vehicle. This means that the vehicle component provides the weather data for the control data. Accordingly, the control device may also be informed at any time about the current weather situation in which the motor vehicle finds itself without a radio link to the external higher-level computing apparatus. The predetermined pedal characteristic curve is therefore beneficially selected using the current weather situation even when the motor vehicle is positioned in a dead zone, or when there is any other interrupted radio link between the motor vehicle and the computing apparatus.

In this context, it has proven to be beneficial when the vehicle component is a sensor apparatus, or a windshield wiper apparatus, or a headlamp apparatus. The sensor apparatus may for example be a camera apparatus or a rain sensor. The weather data characterizing the weather situation of the motor vehicle may be detected by means of the camera apparatus and/or the rain sensor and provided to the control device. Rainfall strength, for example, may be ascertained by the rain sensor and a probability of aquaplaning occurring may be ascertained after ascertaining the rainfall strength. Depending on the ascertained rainfall strength and/or the ascertained probability of aquaplaning, the predetermined pedal characteristic curve may be selected. Restricted visibility on the part of the driver of the motor vehicle from fog and/or strong rain may be ascertained by the camera apparatus, and the predetermined pedal characteristic curve may be selected depending on the restricted visibility. The weather situation, in particular the rainfall strength, may also be inferred using a wiper frequency of the windshield wiper apparatus. By means of the headlight apparatus, it may be ascertained if the headlight apparatus is activated, and if so, which lights of the headlight apparatus are activated. If for example low beams of the headlight apparatus are activated, it may be inferred from this that the motor vehicle is in a dark environment, for example due to twilight. When for example a rear fog lamp is activated, it may be inferred that motor vehicle driver visibility is restricted from fog. Consequently, the predetermined pedal characteristic curve may be selected depending on the activation of the headlight apparatus. By means of this vehicle component, the weather data may be provided very easily, and the weather situation may be ascertained by the control device very easily from the weather data.

Another embodiment provides that the control device selects the predetermined pedal characteristic curve at least depending on a traffic situation of the motor vehicle that is ascertained by the control device depending on traffic data characterizing the traffic situation of the motor vehicle. In other words, the control device receives the traffic data and ascertains the traffic situation depending on the traffic data. Then the control device selects the predetermined pedal characteristic curve depending on the traffic situation. Traffic situations may for example be highway driving by the motor vehicle, or city driving by the motor vehicle, or country road driving by the motor vehicle. Alternatively or in addition, the traffic situation may characterize how many road users are located in a specific environment around the motor vehicle and how these other road users are behaving. In this regard, the traffic situation may for example characterize that the motor vehicle is in slow traffic, or respectively in a traffic jam. Consequently, the control device may select the predetermined pedal characteristic curve depending on the slow traffic, or respectively traffic jam. Alternatively or in addition, the control device may select the predetermined pedal characteristic curve depending on whether the respective traffic data characterize that the motor vehicle is in highway driving, country road driving or city driving. Beneficially, the predetermined pedal characteristic curve may therefore be optimally selected with reference to the traffic situation, and the particular speed range specified by the predetermined pedal characteristic curve may be adapted to the traffic situation.

In this context, it has proven to be beneficial when the control device receives the traffic data at least from the external higher-level computing apparatus through a radio link. The external higher-level computing apparatus may in this case be an online service. Alternatively, the external, higher-level computing apparatus may be a server apparatus by means of which the motor vehicle may for example communicate with another motor vehicle through car-to-car communication, or with a traffic infrastructure component such as a traffic light apparatus through car-to-infrastructure communication. This makes it possible for the motor vehicle to receive the traffic data through the Internet, and/or through the other motor vehicle, and/or through the traffic infrastructure component. From the traffic data, the control device may, for example, ascertain a vehicle density in the area of the motor vehicle that characterizes a specific number of vehicles in a specific environment around the motor vehicle, and may select the predetermined pedal characteristic curve depending on the vehicle density. Accordingly, the speed range for controlling the motor vehicle may be selected by means of the predetermined pedal characteristic curve depending on the vehicle density.

In an embodiment, it is provided that the control device receives the traffic data at least from a sensor apparatus. In this case, the sensor apparatus may be a distance sensor, in particular a laser apparatus or an ultrasonic apparatus. By means of the distance sensor, a distance between the motor vehicle and another road user such as another motor vehicle may be ascertained. The predetermined pedal characteristic curve may be selected depending on the distance. In this case, the predetermined pedal characteristic curve may in particular be selected so that as the distance between the motor vehicle and the other road user decreases, a predetermined pedal characteristic curve is selected, the upper speed limit of which is selected to be correspondingly small. This means that given a first distance between the motor vehicle and the other road user, a first predetermined pedal characteristic curve with a first upper speed limit is selected, and given a second distance differing from the first distance, a second predetermined pedal characteristic curve is selected that differs from the first predetermined pedal characteristic curve and that has a second speed limit different from the first speed limit. In this case, the first speed limit is lower than the second speed limit to the extent that the first distance is smaller than the second distance. This may substantially prevent collisions between the motor vehicle and the other motor vehicle.

Another embodiment provides that the control device selects the predetermined pedal characteristic curve at least depending on a speed default that is ascertained by the control device depending on the speed data characterizing the speed default. This means that the control device may select the predetermined pedal characteristic curve depending on the speed default, and/or the traffic situation, and/or the weather situation. The speed default may for example be a speed limit that is specified locally or transregionally. This speed default may be provided with an offset which is an allowance, wherein the offset may be specified absolutely or in percent. Moreover, the offset may for example be specified by a driver of the motor vehicle. The speed default may for example characterize a currently permissible maximum speed of the motor vehicle. The predetermined pedal characteristic curve may be selected with reference to the currently permissible maximum speed.

In this context, it has proven to be beneficial when the control device receives the speed data at least from the external higher-level computing apparatus through a radio link. Accordingly, the control device may receive the speed data of the online service from the Internet through for example a cell phone link. In this case, the speed data may for example characterize a speed limit as a consequence of a building site, wherein the control device receives given speed limits for specific road sections through the online service. Moreover, particular speed limits saved in the control device may be updated for a route of the motor vehicle through the online service.

In an embodiment, the control device may receive the speed data at least from a vehicle component of the motor vehicle. In this case, it is in particular beneficial that no radio link from the control device to the external higher-level computing apparatus must exist to receive the speed data since the control device receives the speed data from the vehicle component. In this case, the speed data may be ascertained by means of the vehicle component and provided to the control device.

In this case, it has proven to be beneficial when the vehicle component is a sensor apparatus, or a navigation system of the motor vehicle. The sensor apparatus may be a camera apparatus by means of which an environment of the motor vehicle may be recorded. In this case, traffic signs may for example be recorded by means of the camera apparatus, and the speed data may be ascertained by means of image processing software from the records created by the camera apparatus. This is so-called traffic sign recognition. In an embodiment, the control device may receive the speed data from the navigation system. Map data may be saved in the navigation system from which the speed data may be ascertained. In particular, speed limits may be saved in the navigation system by means of which the speed data may be ascertained. This yields the benefit that even when a driving route of the motor vehicle spontaneously changes, the speed data may be ascertained very easily since speed defaults may be saved in the navigation system, or the speed data may be ascertained through the sensor apparatus by means of traffic sign recognition.

An embodiment of the method provides that the predetermined driving mode is cross-country driving and/or driving or maneuvering the motor vehicle with a trailer coupled to the vehicle. The method may be used very precisely if necessary, for example by activating the particular driving mode. Depending on the set driving mode, there may be an adaptation to every required driving situation. As already mentioned, it is of great benefit especially in cross-country driving with a continuously changing incline or descent of the roadway if a driver does not have to continuously adapt the engine performance in order to maintain a constant driving speed, and a control device does this for him instead. Likewise when driving with a trailer, relieving the driver and especially a more precise setting of the driving speed are possible if a control device automatically sets a driving speed of the motor vehicle independent of any additional load from the trailer that must be compensated for by a particular engine performance to achieve a predetermined driving speed.

As already mentioned, a motor vehicle with a pedal device and a control device for such a motor vehicle also belong to the invention according to other exemplary aspects. The motor vehicle control device is designed in this case such that it executes the method of the first aspect in order to set a driving speed of the motor vehicle by a control corresponding to the operating position depending on an operating position of the pedal device.

In the following, further exemplary embodiments of the invention are described.

In the exemplary embodiments, the described components of the embodiments each represent individual features that should be considered independent of each other, and each also develop the invention independently from each other and should therefore be considered as a part of the invention both individually or in another combination other than that shown. In addition, the described embodiments may also be supplemented by other features than those already described.

Elements having the same functions are, in each case, provided with the same reference numerals in the FIGS.

In this regard, FIG. 1 shows a schematic representation of a motor vehicle 10 whose driving speed 11 on a route 12 is set according to the method. The motor vehicle 10 has a pedal device 13 that may assume an operating position 14 between two respective extreme positions 15 and 16. The driving speed 11 is set in this case independent of a condition or road condition 17, or a condition or road condition 18 of the route 12. If the operating position 14 is for example set to a target driving speed of 20 km/h, the driving speed 11 is adapted or controlled to 20 km/h according to the method independent of whether a road condition 17, 18 or any other road condition exists on the route 12.

FIG. 2 shows a schematic representation of a linear pedal characteristic curve 20 and a nonlinear pedal characteristic curve 21. A target driving speed 22 is specified depending on the respective pedal characteristic curve 20, 21 and a respective operating position 26 of the pedal device 13, wherein FIG. 2 shows a first operating position 23, a second operating position 24, and a third operating position 25. The first operating position may for example be an extreme position in which the pedal device is not operated. In this case, the driving speed may be set to 0 km/h. This may apply to both pedal characteristic curves 20 and 21. In a second operating position 24, the set speed driving speed 11 when pedal characteristic curve 20 is used may be higher than with pedal characteristic curve 21. In the operating position 25, the set driving speed with pedal characteristic curve 20 may be lower than with pedal characteristic curve 21. In particular, pedal characteristic curves do not manifest any unsteadiness so that a driving speed does not change suddenly when a respective operating position changes.

FIG. 3 shows a schematic representation of a pedal characteristic curve of a first driving mode 30 and a second driving mode 31. In a first driving mode 30, a first operating position 32 corresponds with a first target driving speed 34, and a second operating position 33 corresponds with a second target driving speed 35. In a second driving mode 31, the first operating position 32 corresponds with the second target driving speed 35, and the second operating position 33 corresponds with a third target driving speed 36.

In an exemplary embodiment, the motor vehicle 10 is on a cross-country drive. The route 12 is therefore a forest drive or a mountain drive. A road condition 17 may for example be an incline of the route, a road condition 18 may for example be a root, a rock or a pothole on the route. If the operating position 14 is for example a value of 50%, the pedal device is therefore depressed by one-half, a speed may be set according to the pedal characteristic curve 30 that lies between the first target driving speed 34 and the second target driving speed 35. If the pedal characteristic curve 30 is a linear pedal characteristic curve, the value that is accordingly set may be the value that lies precisely between the target driving speed 34 and the target driving speed 35. If the pedal characteristic curve 30 is a nonlinear pedal characteristic curve, the set target driving speed may for example also lie closer to the target driving speed 34 than the target driving speed 35.

If in another exemplary embodiment, the condition of the route 12 changes so that there is no unevenness, incline or descent, a user may for example switch to a second pedal characteristic curve 31.

With this pedal characteristic curve 31, the target driving speed that is reached in the operating position 32 may be higher than that which is reached with the pedal characteristic curve 30 in the operating position 32. For example, the target driving speed that is thereby reached may already be the second target driving speed. When the pedal device is depressed to the operating position 33, the target driving speed may be raised by the pedal characteristic curve 31 to the third value of the target driving speed 36 which cannot be reached with pedal characteristic curve 30. Accordingly, the motor vehicle 10 is accelerated according to the method by means of a control device 10' until it has reached the given target driving speed, for example the target driving speed 36.

In another exemplary embodiment, the condition of the street 12 is so bad that the motor vehicle may only drive very slowly, for example less than 6 km/h. 6 km/h may be a creep speed of the motor vehicle 10, i.e., a speed that the motor vehicle 10 reaches when available pedal devices of the motor vehicle 10 are not operated. In particular, a gas pedal and a brake pedal of the motor vehicle 10 are then not used. In a condition 18 that for example may be a large rock, a user may press the brake pedal halfway, and the target speed of 6 km/h may thereby fall for example to 3 km/h by means of a pedal characteristic curve (not shown) so that driving over the rock may be harmless and damage-free. If the driver wishes to bring the motor vehicle 10 to a standstill, he may completely depress the brake pedal, for example, and thereby bring it into an extreme position that corresponds to a target driving speed of 0 km/h. A pedal characteristic curve may also be used that eventuates in a target driving speed of 0 km/h, i.e., a motor vehicle standstill when a brake pedal is depressed 80%; accordingly, free travel of the pedal is used. Such free travel may also be used in other pedal characteristic curves.

The example shows how a driving pedal, or gas pedal or a pedal of a motor vehicle is used to provide a motor vehicle speed. According to the method, the actual driving speed is then controlled to the specified driving speed or target driving speed. The method may be beneficially used if there is an explicit request from a driver, for example because he makes a particular setting in a specific driving situation, such as a cross-country drive, which activates the method. In this case, the method may be limited to maximum driving speeds that are for example 80 km/h or 40 km/h. The benefit is that the adjustment path of the pedal, which is limited for ergonomic reasons, may resolve the speed to be set more sensitively or suitably, or may better exploit the adjustment path. Accordingly, the pedal path may have a high resolution at a low driving speed and a low resolution at a high driving speed. This means that at a high driving speed, a slight change in the operating position causes a major change in the driving speed.

The predetermined pedal characteristic curve may be selected not just depending on the condition of the street 12, but also depending on a weather situation and/or a traffic situation and a speed default. The weather situation may be ascertained by the control device depending on the weather data characterizing the weather situation. In this case, the control data may receive the weather data at least from an external higher-level computing apparatus, in particular a server apparatus on the Internet, through a radio link or from a vehicle component of the motor vehicle. The vehicle component may be a sensor apparatus, or a windshield wiper apparatus, or a headlamp apparatus of the motor vehicle. Alternatively or in addition to the weather situation, the control device may select the predetermined pedal characteristic curve depending on the traffic situation. In doing so, the control device ascertains the traffic situation of the motor vehicle depending on the traffic data characterizing the traffic situation of the motor vehicle. This traffic data in turn may be received by the control device from the external higher-level computing apparatus through the radio link, or from the sensor apparatus of the motor vehicle.

Moreover, the control device may select the predetermined pedal characteristic curve depending on the speed default. The control device may ascertain this speed default depending on speed data that characterize the speed default. In particular, the speed default may be speed limits and/or recommended speeds. This speed data may be received by the control device from the external higher-level computing apparatus on the Internet through the radio link, or from one of the vehicle components of the motor vehicle. This means that the control device may receive the speed data from the sensor apparatus that in particular has a camera apparatus, or from a navigation system of the motor vehicle. In the method, the speed range that is triggered by the driving pedal may be specified by the motor vehicle. Accordingly both an upper limit that characterizes a speed in the event of a complete depression of the driving pedal as well as a lower limit that characterizes a speed of the driving pedal in its home position may be specified by the motor vehicle. This setting of the speed range that is triggered by the driving pedal and accordingly the selection of the predetermined pedal characteristic curve may occur based on a current permissible speed range. The current permissible speed may be known by the motor vehicle and in particular the control device based on map data from the navigation system or through traffic sign recognition by the sensor apparatus. It is recommendable to adopt the speed that is currently permissible as the upper limit for a complete actuation of the driving pedal. Alternatively, the speed that is currently permissible may be provided with a fixed offset, which is to be understood as an allowance, that may be set by the driver of the motor vehicle. By means of the driving pedal, the driver would then only set the extent to which he would use the currently permissible speed range.

Moreover, it may be recommendable to adapt to the upper limit to environmental conditions. Through online services, and/or the camera apparatus, and/or the rain sensors, it is possible for the motor vehicle to ascertain the weather data, and ascertain the weather situation depending on the weather data, and accordingly for reliable information to be obtained on current weather conditions. This weather data make it possible to adapt the upper speed limit by selecting the correspondingly predetermined pedal characteristic curve. Therefore in the event of dense fog, strong rain or slick ice, the respective speed of the motor vehicle may be correspondingly set. If no online data from the online services are available, the vehicle's own sensor apparatus, in particular a rain/light sensor or other vehicle components such as a windshield wiper apparatus and in particular its windshield wiper position as well as a rear fog lamp may be taken into consideration. By overriding the control of the driving pedal, in particular by a kickdown, it is still possible for the driver to independently select the speed of the motor vehicle independent of the weather or a legal situation, in particular with respect to the currently permissible speed range.

An adaptation of the lower limit of a speed default specified by means of the specified pedal characteristic curve is also recommendable as an embodiment. The motor vehicle may possess a very clear knowledge of surrounding vehicles through its distance sensor apparatus. Especially on highways, how his motor vehicle behaves with respect to other road users may be important for the driver. In this case, a respective absolute speed of the motor vehicle may be less important to the driver. A minimum speed and hence the lower limit of the speed default should not be 0 km/h, in particular on highways; instead, it could be oriented around a slowest road user in a specific environment surrounding the motor vehicle. In this case, the minimum speed could in particular be configured to individual lanes on German highways. For a truck, this would be 80 km/h, or 130 km/h for a line of passenger cars in a longer drive.

Alternatively or in addition, a speed band of the control may be adapted, in particular the speed range that the driving pedal resolves depending on car-to-X data, or respectively cluster data. The "car-to-X data" are to be understood as data that are communicated by the motor vehicle through a particular radio link to its environment, such as other motor vehicles or a traffic infrastructure component, or other installations arranged in a given surrounding of the motor vehicle.

Through an actuation of the brake pedal, the driver has an easy way to correct a particular speed of the motor vehicle downward according to his wishes.

By selecting the predetermined pedal characteristic curve depending on the speed default, and/or the weather situation, and/or the traffic situation of the motor vehicle, the speed control of the motor vehicle may be adapted to applicable speed defaults and weather conditions.

The method may adapt the driving speed by a vehicle brake, or also just adapt or regulate the speed through the engine torque. The regulating methods are selected in this case so that both an acceleration as well as a braking process are limited, i.e., the motor vehicle cannot make jerky movements. The target driving speed may for example be displayed in a display of the motor vehicle. In the event that the method is used in an electrified motor vehicle, an existing electric motor may take over rotational speed control which also prevents a wheel from spinning. The speed of the wheel remains constant, and the wheel therefore does not spin; at most, slip increases. The method may also be used for maneuvering trucks. Accordingly, a constant speed may be set by the driving pedal that may for example be close to the creep speed. The pedal characteristic curve may also be configured to be variable so that only small changes are made to the target driving speed in the event of slow changes to the operating position, and large changes to the target driving speed are made in the event of quick changes to the operating position. The pedal characteristic curve may be changed or switched by means of a kickdown, or speed ranges of the pedal characteristic curve may be changed. For example in the event of a kickdown, a target driving speed may be switched from 10 km/h to 40 km/h for a first 100% extreme position and, in the event of a 0% operating position, the corresponding target driving speed may be reset to 10 km/h. A signal of the brake pedal of the motor vehicle may also be used as an input signal. The execution of the method may be selected by a driver in a motor vehicle for example in that the driver selects said additional function, for example in that he operates a lever, a button, a switch and/or a virtual key on a display. A pedal characteristic curve for a brake pedal may be configured so that there is certain free travel in which no braking occurs, for example a value of the operating position from 0% to 30%. It may also be provided that the creep speed of the motor vehicle may be set by the user in the method. Consequently, the creep speed may for example be further reduced, and the resolution of the pedal device may be further increased between the two extreme positions. A reduction of the driving speed to adapt it to a lower target driving speed may also be performed in an electrified motor vehicle by recuperation, that is, energy recovery. A major benefit and element is that a brake pedal or an operating position of the brake pedal may also be used as a direct input signal for a driving function. According to the method, a high drive torque of the engine up to full engine torque may also be used in this case even at speeds below the creep speed in order for example to drive on very steep slopes at a precisely defined driving speed. A brake may be supported or controlled by an electronic brake booster. This may enable linear transmission behavior of the operating position of the brake pedal or a pedal characteristic curve corresponding thereto. Accordingly, both the brake pressure or braking effect as well as engine torque or drive torque of the motor vehicle are controlled. Through another "auto-hold" function, the motor vehicle may also be held autonomously; in the event of acceleration, the function may be deactivated or released. To limit the vehicle acceleration, filters or gradient limits may be provided so that when the pedal or pedal device changes suddenly, comfortable and safe starting is enabled. Fast braking is however still ensured in this case. If the method is performed by a motor vehicle or a control device of the motor vehicle, this may be shown to a driver of the motor vehicle in a suitable way, for example on a display of the motor vehicle. The method may ideally also be used for electrified motor vehicles since they possess recuperation. The benefit of the method is that a single pedal may be used to regulate or control a driving function, i.e., the driving speed. Either the brake pedal or the driving pedal may therefore be used individually in order to adapt or regulate the speed to a speed desired or specified by the driver. By means of the brake pedal, especially low speeds may be set or controlled very precisely.

Overall, the example illustrates how a pedal device with a single pedal, such as the gas pedal or the brake pedal of a motor vehicle, is used to set or regulate a specified target driving speed independent of a road condition such as an incline or road unevenness. A target driving speed is hence specified by the operating position of the pedal device, and engine torque is not set. The engine torque is adapted according to the method by a control device to achieve the specified driving speed. The driving speed of the motor vehicle is adapted according to the method as long as the particular operating position of the pedal device lasts.

LIST OF REFERENCE NUMBERS

(10) Motor vehicle
(11) Driving speed
(12) Route
(13) Pedal device
(14) Operating position
(15) Extreme positions
(16) Extreme positions
(17) Condition
(18) Condition
(20) Pedal characteristic curve
(21) Pedal characteristic curve
(22) Target driving speed
(23) Operating position
(24) Operating position
(25) Operating position
(26) Operating position
(30) Driving mode
(31) Driving mode
(32) Operating position
(33) Operating position
(34) First target driving speed
(35) Second target driving speed
(36) Third target driving speed The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for setting a driving speed of a motor vehicle on a route, wherein a control device of the motor vehicle sets the driving speed depending on an operating position limited by two extreme positions of a pedal device of the motor vehicle, which may be operated by a driver, comprising:
   detecting the operating position of the pedal device;
   depending on the detected operating position and in at least one specified driving mode, determining a target driving speed corresponding to the respective operating position; and
   controlling the driving speed corresponding to the respective target driving speed using a closed loop control as long as the respective operating position is detected independent of a current condition of the route; wherein
   the target driving speed is increased when the operating position changes toward a first of the extreme positions, and the target driving speed is reduced when the operating position changes toward a second of the extreme positions.

2. The method of claim 1, wherein a single vehicle pedal of the motor vehicle is used as the pedal device, wherein the extreme positions each correspond to a target driving speed predetermined by the driving mode.

3. The method of claim 1, wherein
   an acceleration pedal is used as the pedal device, and a change in an operating position of the acceleration pedal from an unoperated extreme position into a fully depressed extreme position corresponds to an increase in the target driving speed;
   and/or a brake pedal is used as the pedal device, and a change in its operating position from an unoperated extreme position into a fully depressed extreme position corresponds to a reduction of the target driving speed.

4. The method of claim 1, wherein the target driving speed is ascertained by the operating position of the pedal device in combination with a predetermined pedal characteristic curve of the pedal device.

5. The method of claim 4, wherein a nonlinear pedal characteristic curve is used as the pedal characteristic curve, and/or the pedal characteristic curve is selected and/or defined by a user.

6. The method of claim 4, wherein the pedal characteristic curve is set at least relative to an effect of a change of the operating position on a change of the target driving speed depending on one or more of the driving speed and a current gear ratio.

7. The method of claim 4, wherein
   the control device changes the predetermined pedal characteristic curve when a kickdown of the pedal device is detected,
   or another predetermined pedal characteristic curve is used to determine the target driving speed after the kickdown.

8. The method of claim 4, wherein the control device selects the predetermined pedal characteristic curve at least depending on a weather situation that is ascertained by the control device depending on weather data characterizing the weather situation.

9. The method of claim 8, wherein the control device receives the weather data at least from an external higher-level computing apparatus through a radio link.

10. The method of claim 8, wherein the control device receives the weather data at least from a vehicle component of the motor vehicle.

11. The method of claim 10, wherein
   the vehicle component is a sensor apparatus, or a windshield wiper apparatus, or a headlamp apparatus.

12. The method of claim 4, wherein the control device selects the predetermined pedal characteristic curve at least depending on a traffic situation of the motor vehicle that is ascertained by the control device depending on the traffic data characterizing the traffic situation of the motor vehicle.

13. The method of claim 12, wherein the control device receives the traffic data at least from the external higher-level computing apparatus through a radio link.

14. The method of claim 12, wherein the control device receives the traffic data at least from a sensor apparatus.

15. The method of claim 4, wherein the control device selects the predetermined pedal characteristic curve at least depending on a speed default that is ascertained by the control device depending on speed data characterizing the speed default.

16. The method of claim 15, wherein the control device receives the speed data at least from the external higher-level computing apparatus through a radio link.

17. The method of claim 15, wherein the control device receives the speed data at least from a vehicle component of the motor vehicle.

18. The method of claim 17, wherein the vehicle component is a sensor apparatus or a navigation system.

19. The method of claim 1, wherein the predetermined driving mode is one or more of cross-country driving and driving or maneuvering the motor vehicle with a trailer coupled to the vehicle.

20. A motor vehicle with a pedal device and a control device for setting a driving speed of the motor vehicle corresponding to an operating position of the pedal device, wherein the control device is configured for:
   detecting the operating position of the pedal device;
   depending on the detected operating position and in at least one specified driving mode, determining a target driving speed corresponding to the respective operating position; and
   controlling the driving speed corresponding to the respective target driving speed using a closed loop control as long as the respective operating position is detected independent of a current condition of a route; wherein
   the target driving speed is increased when the operating position changes toward a first extreme position of the pedal device, and the target driving speed is reduced when the operating position changes toward a second extreme position of the pedal device.

21. A method for setting a driving speed of a motor vehicle on a route, wherein a control device of the motor vehicle sets the driving speed depending on an operating position limited by two extreme positions of a pedal device of the motor vehicle, which may be operated by a driver, comprising:
   detecting the operating position of the pedal device;
   depending on the detected operating position and in at least one specified driving mode, determining a target driving speed corresponding to the respective operating position; and
   controlling the driving speed corresponding to the respective target driving speed using a closed loop control as long as the respective operating position is detected independent of a current condition of the route; wherein a single vehicle pedal of the motor vehicle is used as the pedal device, wherein the extreme positions each correspond to a target driving speed predetermined by the driving mode.

\* \* \* \* \*